March 3, 1931.    R. M. SMITH ET AL    1,794,740
REVOLVING ADVERTISING SIGN
Filed Aug. 20, 1930
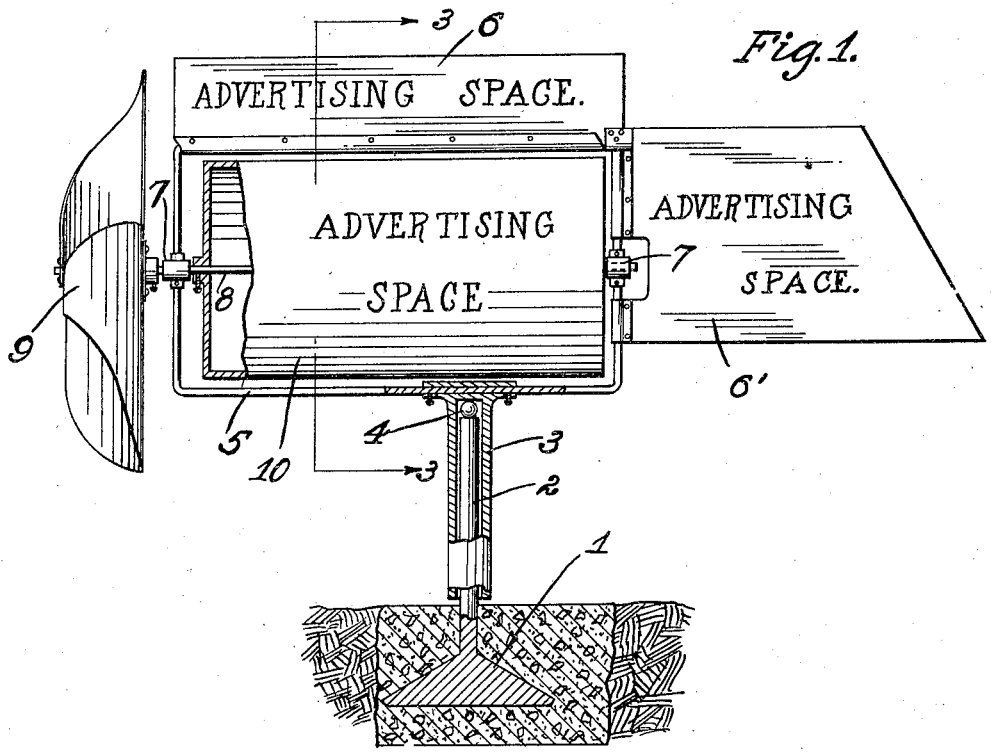
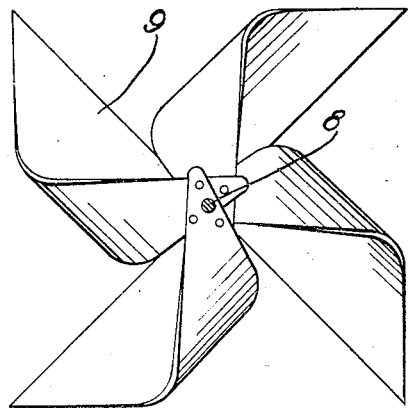
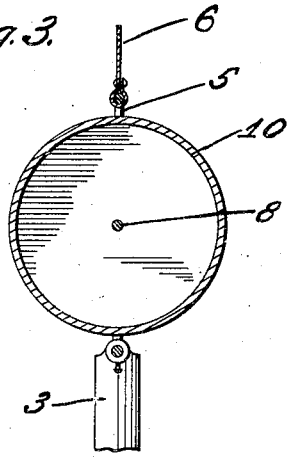
Robert M. Smith.
Frank Hermanski.
INVENTOR
BY Victor J. Evans
ATTORNEY
George L. Ogle.

Patented Mar. 3, 1931

1,794,740

UNITED STATES PATENT OFFICE

ROBERT M. SMITH AND FRANK HERMANSKI, OF ENID, OKLAHOMA

REVOLVING ADVERTISING SIGN

Application filed August 20, 1930. Serial No. 476,676.

Our present invention has reference to a wind influenced advertising sign and my object is the provision of a sign that includes a frame having wings on which is inscribed matter, a drum or cylinder journaled in the frame and bearing other advertising matter and rotated by a wind wheel, and whereby the influence of the wind will cause the frame to turn horizontally on its support and the turning of the wind wheel will revolve the cylinder so that the different advertising matter will be displayed at different angles and altogether to present a simple, novel and effective advertising device.

To the attainment of the foregoing the invention consists in the improvement hereinafter described and definitely claimed.

In the drawings:

Figure 1 is a side elevation of the improvement with parts in section.

Figure 2 is an end view of the wind wheel.

Figure 3 is a sectional view approximately on the line 3—3 of Figure 2.

In carrying out our invention we embed in the ground surface the enlarged end 1 of a rod member that affords a standard 2. The standard has arranged thereover a tubular sleeve 3, there being a ball bearing 4 between the outer end of the standard and the closed end of the sleeve.

Fixedly, but if desired, adjustably secured to the outer and closed end of the sleeve 3 there is the lower member of a substantially rectangular frame 4. The frame is of light but strong metal and has fixed on its top member a plate 5 that carries advertising matter. On one of its ends there is also fixed a wing-like plate 6 on which is also inscribed advertising matter.

The side members of the frame are provided with bearings 7 for a shaft 8 that extends through the end of the frame opposite that provided with the wing 6 and has fixed on its said extending end a wind wheel 9.

The shaft passes centrally through bosses on the ends of a drum 10 and the said drum has its outer surface provided with advertising matters.

The force of wind will contact with the wing 6 to bodily revolve the frame and likewise revolve the drum 10 in a horizontal direction, while the wind contacting with the wheel 9 will rotate the shaft 8 to which the drum 10 is fixed so that the advertising matter on all the parts of the sign will be brought to display positions.

It is to be understood that the details of invention herein described and illustrated are for the purpose of explaining our invention and are to be interpreted as illustrative and not in a limiting sense.

Having described the invention, we claim:

1. A wind influenced advertising device including a frame mounted for horizontal turning, a wing on one end of the frame bearing advertising matter, a plate on the top of the frame also bearing advertising matter, a shaft journaled centrally through the ends of the frame, a wind wheel on one end of the shaft and a drum bearing advertising matter fixed on the shaft and arranged in the frame.

2. A wind influenced advertising device including an upright standard, a sleeve having an outer closed end, an anti-frictional bearing between the closed end of the sleeve and the outer end of the standard, a substantially rectangular light frame having its lower element adjustably secured to the sleeve, a wing plate fixed on one end of the frame and bearing advertising matter, a plate fixed on the top of the frame also bearing advertising matter, a shaft journaled centrally through the ends of the frame, a wind wheel fixed on one end of the shaft, a cylindrical drum fixed on the shaft, arranged in the frame and bearing advertising matter.

In testimony whereof we affix our signatures.

ROBERT M. SMITH.
FRANK HERMANSKI.